(12) United States Patent
Hanlon et al.

(10) Patent No.: US 8,742,711 B2
(45) Date of Patent: Jun. 3, 2014

(54) ACTIVE FEEDBACK USER INTERFACE SYSTEM AND GIMBAL ASSEMBLY THEREFOR

(75) Inventors: Casey Hanlon, Queen Creek, AZ (US); Donald Jeffrey Christensen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 368 days.

(21) Appl. No.: 13/240,933

(22) Filed: Sep. 22, 2011

(65) Prior Publication Data

US 2013/0074631 A1    Mar. 28, 2013

(51) Int. Cl.
*G05G 9/047* (2006.01)

(52) U.S. Cl.
USPC ........ 318/575; 318/625; 74/471 XY; 345/161

(58) Field of Classification Search
USPC .............. 318/568.2, 575, 625, 626, 632, 652, 318/657; 74/469, 471 R, 473.1, 473.12, 74/471 XY, 479.01, 480 R, 481; 341/20; 345/161
See application file for complete search history.

(56) References Cited

U.S. PATENT DOCUMENTS

| | | | |
|---|---|---|---|
| 3,323,607 A | | 6/1967 | Futamata |
| 3,386,694 A | | 6/1968 | Boyle |
| 3,744,335 A | * | 7/1973 | Karlsson et al. ......... 74/471 XY |
| 4,238,802 A | | 12/1980 | Speicher |
| 4,651,591 A | | 3/1987 | Wurst |
| 4,729,258 A | | 3/1988 | Mohri et al. |
| 4,858,490 A | | 8/1989 | Grant |
| 5,436,640 A | * | 7/1995 | Reeves .......................... 345/161 |
| 5,619,195 A | | 4/1997 | Allen et al. |
| 5,769,748 A | | 6/1998 | Eyerly et al. |
| 5,831,596 A | | 11/1998 | Marshall et al. |
| 6,082,672 A | | 7/2000 | Audren |
| 6,353,430 B2 | * | 3/2002 | Cheng et al. .................. 345/161 |
| 6,484,608 B1 | | 11/2002 | Ziavras |
| 6,501,459 B1 | | 12/2002 | Takigawa et al. |
| 6,644,600 B1 | | 11/2003 | Olson et al. |
| 7,411,521 B2 | | 8/2008 | Lewis et al. |
| 2001/0002127 A1 | * | 5/2001 | Cheng et al. .................. 345/161 |
| 2010/0242654 A1 | | 9/2010 | Corney |

* cited by examiner

*Primary Examiner* — Bentsu Ro
(74) *Attorney, Agent, or Firm* — Ingrassia Fisher & Lorenz, P.C.

(57) ABSTRACT

An active user interface system includes a gimbal assembly that is configured as a dual-input/single-output differential mechanism. The differential mechanism implements a speed reduction from the inputs of the differential mechanism to the output of the differential mechanism. Speed reduction enables the maximum drive torque that is supplied to the user interface about one rotational axis to be greater than the maximum drive torque that is supplied to the user interface about another, perpendicular axis.

20 Claims, 10 Drawing Sheets

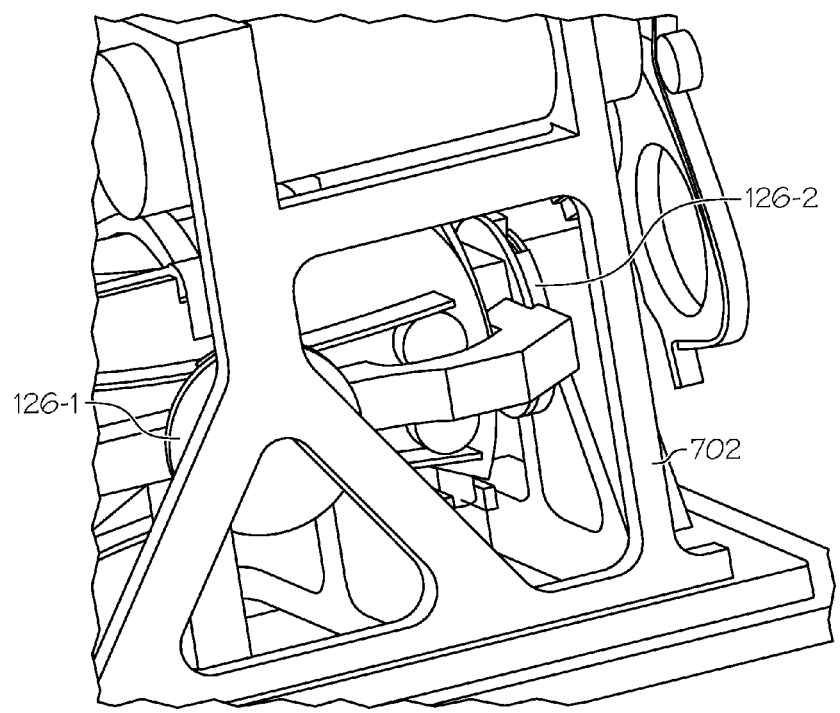
FIG. 13
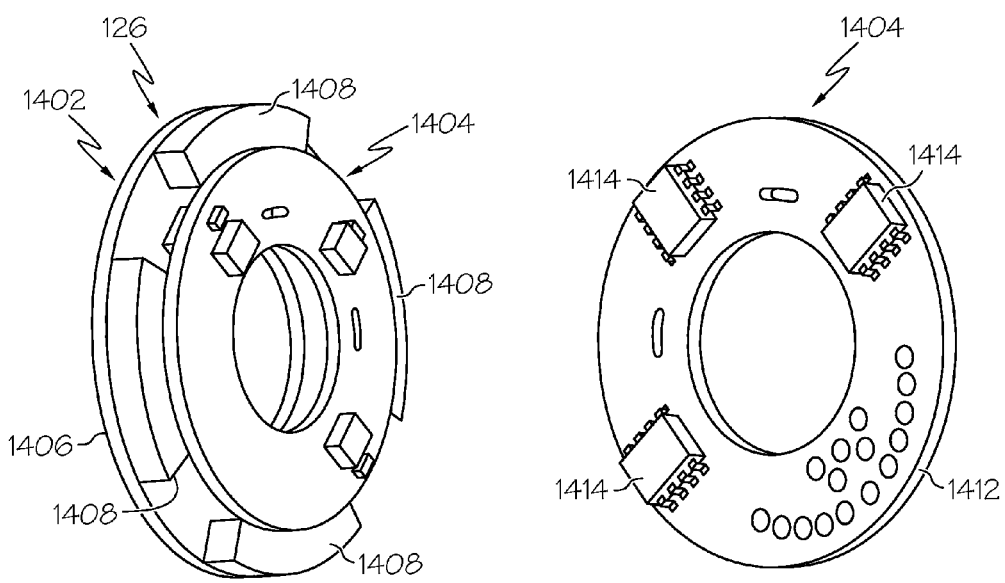
FIG. 14
FIG. 15

ACTIVE FEEDBACK USER INTERFACE SYSTEM AND GIMBAL ASSEMBLY THEREFOR

TECHNICAL FIELD

The present invention relates to user interface systems and, more particularly, to an active user interface system and a gimbal assembly for an active user interface system.

BACKGROUND

Human-machine interfaces that are used to translate human movements to machine movements are used in myriad industries. For example, some aircraft flight control systems include a human-machine interface in the form of one or more control sticks. The flight control system, in response to input forces supplied to the control stick from the pilot, controls the movements of various aircraft flight control surfaces. No matter the particular end-use system, the human-machine interface preferably includes some type of haptic feedback mechanism back through the interface to the interface operator. The haptic feedback mechanism may be passive, active, or both. The interface also typically includes one or more devices, such as a gimbal assembly, for accurately converting angular displacements into rotary motion.

In many instances, the devices that are used to convert angular displacements to rotary motion are relatively complex, relatively large, relatively heavy, and relatively costly. Hence, there is a need for a device that converts angular displacements to rotary motion that is relatively simple, relatively small, relatively light-weight, and relatively inexpensive. The present invention addresses at least this need.

BRIEF SUMMARY

In one embodiment, an active feedback user interface system includes a plurality of motors, a first input mechanism, a second input mechanism, a user interface drive mechanism, and an idler mechanism. Each motor is configured, when energized, to supply a motor torque about a first rotational axis. The first input mechanism is configured to rotate about the first axis. The first input mechanism is coupled to receive the motor torque supplied from a first one of the plurality of motors and is configured, upon receipt thereof, to supply a first output torque. The second input mechanism is spaced apart from the first input mechanism and is configured to rotate about the first rotational axis. The second input mechanism is coupled to receive the motor torque from a second one of the plurality of motors and is configured, upon receipt thereof, to supply a second output torque. The user interface drive mechanism is configured to rotate about a second rotational axis that is perpendicular to, and co-planar with, the first rotational axis. The user interface drive mechanism is coupled to receive the first and second output torques from the first and second input mechanisms, respectively. The idler mechanism is spaced apart from the drive mechanism and is configured to rotate, with the user interface drive mechanism, about the second rotational axis. The first and second input mechanisms and the drive mechanism are configured to implement an N:1 reduction ratio, where N is greater than 1.

In another embodiment, an active gimbal assembly for a vehicle that is controllable about at least a roll axis and a pitch axis includes a first motor, a second motor, a first input mechanism, a second input mechanism, a user interface drive mechanism, and an idler mechanism. The first motor is configured, when energized, to supply a first motor torque about the roll axis, and the second motor is configured, when energized, to supply a second motor torque about the roll axis, the second motor identical to the first motor. The first input mechanism is configured to rotate about the roll axis. The first input mechanism is coupled to receive the first motor torque and is configured, upon receipt thereof, to supply a first output torque. The second input mechanism is spaced apart from the first input mechanism and is configured to rotate about the roll axis. The second input mechanism is coupled to receive the second motor torque and is configured, upon receipt thereof, to supply a second output torque. The user interface drive mechanism is configured to rotate about the pitch axis, and is coupled to receive the first and second output torques from the first and second input mechanisms, respectively. The idler mechanism is spaced apart from the user interface drive mechanism and is configured to rotate, with the user interface drive mechanism, about the pitch axis. The gimbal assembly is additionally configured to implement an N:1 reduction ratio from the first and second input mechanisms to the drive mechanism.

In yet another embodiment, an active feedback user interface system includes a user interface, a first motor, a second motor, and a gimbal assembly. The user interface is adapted to receive a user input force and is configured, in response to the user input force, to rotate in a rotational direction about one or both of a roll axis and a pitch axis, the roll and pitch axes being perpendicular. The first motor is configured to selectively supply a first motor torque along the roll axis, and the second motor is configured to selectively supply a second motor torque along the roll axis. The gimbal assembly is coupled to the user interface and to the first and second motors. The gimbal assembly is configured, upon receipt of the first and second motor torques, to sum the first and second motor torques and supply a feedback force to the user interface that opposes the rotational direction thereof. The gimbal assembly includes a first input mechanism, a second input mechanism, a user interface drive mechanism, and an idler mechanism. The first input mechanism has a first effective diameter and is configured to rotate about the roll axis. The first input mechanism is coupled to receive the first motor torque from the first motor and is configured, upon receipt thereof, to supply a first output torque. The second input mechanism is spaced apart from the first input mechanism. The second input mechanism has the first effective diameter and is configured to rotate about the roll axis. The second input mechanism is coupled to receive the second motor torque from the second motor and is configured, upon receipt thereof, to supply a second output torque. The user interface drive mechanism has a second effective diameter and is configured to rotate about the pitch axis. The user interface drive mechanism is coupled to the user interface and is further coupled to receive the first and second output torques from the first and second input mechanisms, respectively. The user interface drive mechanism is configured, upon receipt of the first and second output torques, to supply the feedback force to the user interface. The idler mechanism is spaced apart from the user interface drive mechanism, has the second effective diameter, and is configured to rotate, with the user interface drive mechanism and relative to the user interface, about the roll axis. The first effective diameter is less than the second effective diameter, whereby maximum feedback force about the pitch axis is greater than maximum feedback force about the roll axis.

Furthermore, other desirable features and characteristics of the user interface system and gimbal assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 6-13 depict various representations of an embodiment of one particular physical implementation of the gimbal assembly; and FIGS. 14 and 15 depict an exemplary embodiment of one physical implementation of sensors that may be used to sense user interface movement.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In view of the foregoing, it is noted that although the following description is, for convenience, directed to a gimbal assembly implemented with a user interface that is configured as a control stick, it will be appreciated that the system could be implemented with variously configured user interfaces including, for example, variously configured pedals, yokes, levers, and the like. It will additionally be appreciated that the gimbal assembly may be used in any one of numerous applications, such as gyroscopes, that require two degrees of freedom.

Figure 1:
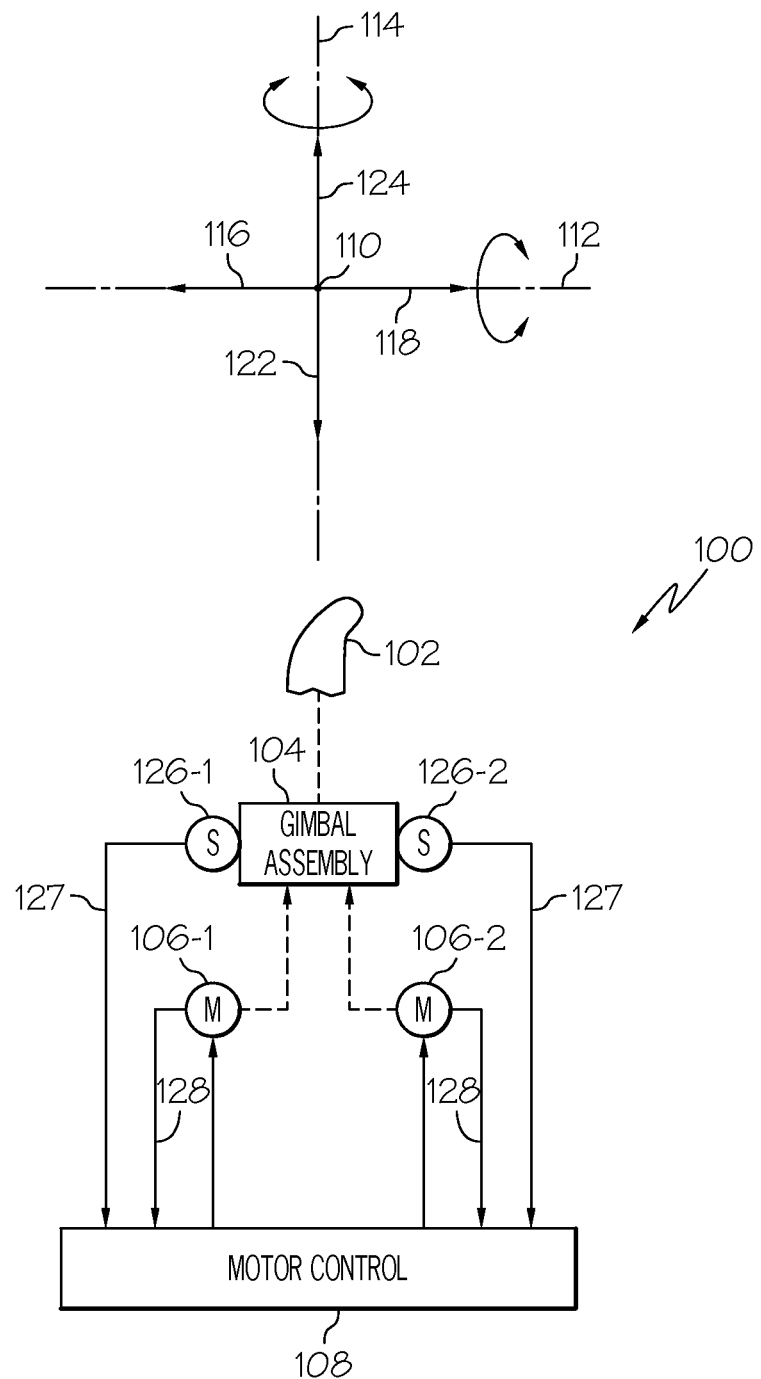
FIG. 1 is a functional block diagram of an exemplary embodiment of an active human-machine interface system.

Turning now to FIG. 1, a functional block diagram of an exemplary active human-machine interface system 100 is depicted. The system 100 includes a user interface 102, a gimbal assembly 104, a plurality of motors 106 (e.g., 106-1, 106-2), and a motor control 108. The user interface 102 is coupled to the gimbal assembly 104 and is configured to move, in response to an input from a user, from a null position 110 to a plurality of control positions in a plurality of movement directions.

The gimbal assembly 104 is coupled to the user interface 102 and is configured to rotate, upon movement of the user interface 102, about two perpendicular and co-planar rotational axes—a first rotational axis 112 and a second rotational axis 114. Thus, if a user moves the user interface 102 in a forward direction 116 or an aft direction 118, the gimbal assembly 104 rotates about the second rotational axis 114. Similarly, if a user moves the user interface in a left direction 122 or a right direction 124, the gimbal assembly 104 rotates about the first rotational axis 112. It will be appreciated that gimbal assembly 104 is additionally configured to allow the user interface 102 to be moved in a combined forward-left direction, a combined forward-right direction, a combined aft-left direction, or a combined aft-right direction, and back to or through the null position 110.

Movement of the user interface 102 is sensed via a plurality of user interface sensors 126 (e.g., 126-1, 126-2). The user interface sensors 126 may be coupled to the user interface 102, the gimbal assembly 106, or to both, and are configured to supply user interface movement signals 127. The user interface sensors 126 may be variously implemented using any one of numerous known force sensors, position sensors, or both. Some suitable force sensors include, but are not limited to, strain gage sensors, piezoelectric sensors, semiconductor sensors, or optical sensors, just to name a few, and suitable position sensors include, but are not limited to, absolute inceptor position sensors such as RVDTs, LVDTs, potentiometers, or optical sensors. Preferably, however, the user interface sensors 126 are implemented using magneto-resistance (MR) type position sensors. No matter the specific number and type of user interface sensors 126, at least one of the sensors 126 is configured to supply user interface movement signals 127 representative of a vector component of user interface movement along the first rotational axis 112 (e.g., in the forward or aft directions 116, 118), and another sensor 126 is configured to supply user interface movement signals 127 representative of a vector component of user interface movement along the second rotational axis 114 (e.g., in the left or right directions 122, 124). The user interface movement signals 127 are supplied to a non-illustrated flight control computer (FCC), though in some embodiments these signals could be supplied to the motor control 108.

As will be described in more detail further below, the motors 106 are each configured, upon being energized, to selectively supply a motor torque about the first rotational axis 112. In the depicted embodiment, the plurality of motors 106 includes a first motor 106-1 and a second motor 106-2. Thus, the first motor 106-1 is configured to selectively supply a first motor torque, and the second motor 106-2 is configured to selectively supply a second motor torque. The motors 106 are preferably identical, and are preferably implemented using multi-phase brushless DC machines. As such, current feedback and commutation signals 128 associated with each motor 106 may also be supplied to the motor control 108.

The motor control 108, in response to the user interface movement signals 127 and the current feedback and commutation signals 128, selectively energizes one or both of the motors 106-1, 106-2 to rotate. As will be described further below, whether one or both of the motors 106 are energized, and the direction in which the motor control 108 causes the motors 106 to rotate, will depend upon the directional movement of the user interface 102. It will be appreciated that although the motor control 108 is depicted using a single functional block, its described functionality could be implemented using two individual motor controls, one associated with each motor 106.

The gimbal assembly 104, in addition to rotating in response to user interface movement 102, is configured to sum the motor torques supplied from the motors 106, and to supply both a drive torque and a feedback force to the user interface 102. Because the torque supplied to the user interface 102 is derived from both motors 106, the motors 106 may be sized smaller as compared to presently known active feedback user interface systems. To implement its functionality, the gimbal assembly 104 is configured as a dual-input/single-output differential mechanism that implements a speed reduction from the inputs of the differential mechanism to the output of the differential mechanism. The purpose for this speed reduction will be described further below.

Figure 2:
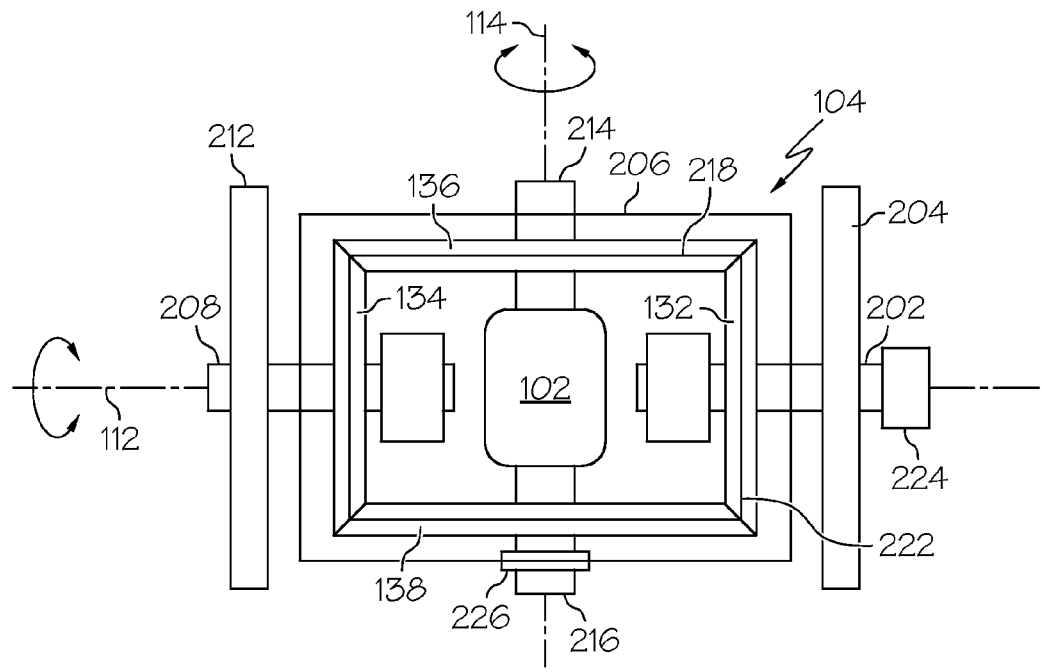
FIG. 2 depicts a simplified representation of a configuration of an embodiment of the gimbal assembly that may be used to implement system of FIG. 1.
Figure 3:
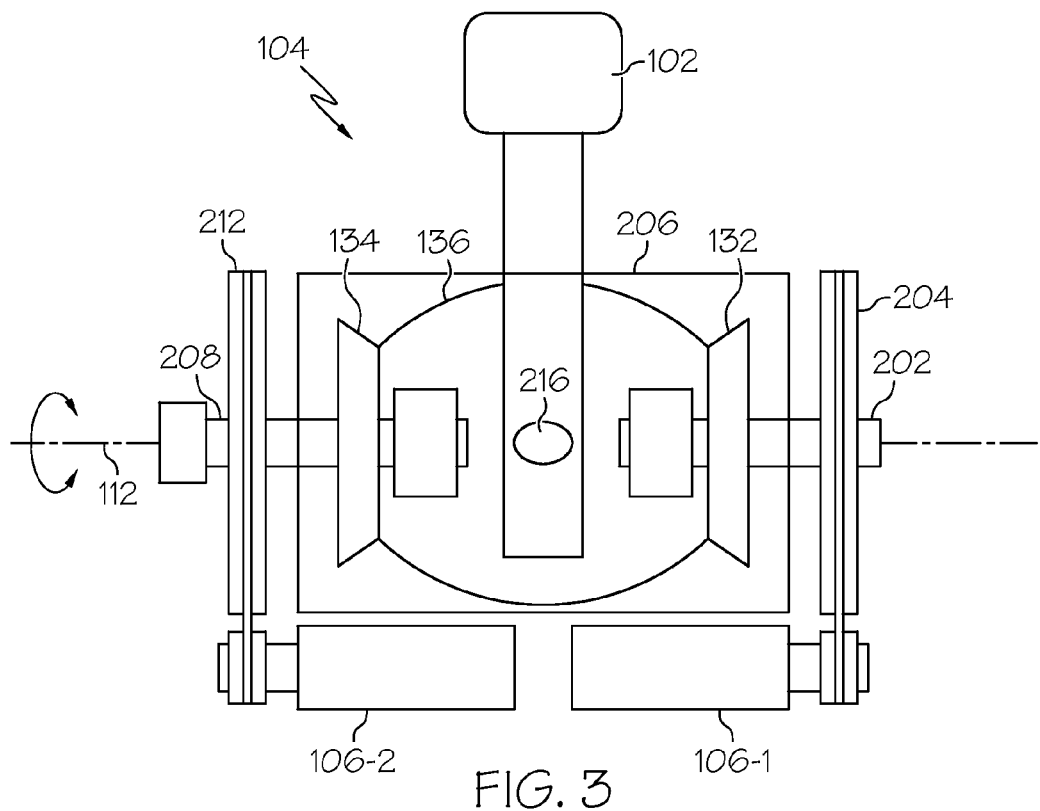
FIG. 3 depicts the gimbal assembly of FIG. 2, taken along line 3-3 in FIG. 2.

Referring now to FIGS. 2 and 3, simplified representations of preferred configurations of the gimbal assembly 104 are depicted and will be described. It may be seen that the depicted gimbal assembly 104 includes a first input mechanism 132, a second input mechanism 134, a user interface drive mechanism 136, and an idler mechanism 138 (not depicted in FIG. 3). The first input mechanism 132 is configured to rotate about the first rotational axis 112, and is coupled to receive the first motor torque that is supplied from the first motor 106-1. Although the first motor 106-1 may supply the first motor torque to the first input mechanism 132 using anyone of numerous suitable techniques, in the depicted embodiment the first motor torque is supplied to the first input mechanism 132 via a first shaft 202 and a first motor output mechanism 204. More specifically, the first shaft 202 is rotationally coupled to a gimbal frame 206, and thus rotates relative to the gimbal frame 206 about the first rotational axis 112. The first shaft 202 is also non-rotationally coupled to the first input mechanism 132 and to the first motor output mechanism 204. The first motor output mechanism 204, which in the depicted embodiment is implemented using a belt-driven pulley, transfers the motor torque from the first motor 106-1 to the first shaft 202.

The second input mechanism 134 is spaced apart from the first input mechanism 132 and is also configured to rotate about the first rotational axis 112. The second input mechanism 134 is coupled to receive the second motor torque that is supplied from the second motor 106-2. Similar to the first motor 106-1, in the depicted embodiment the second motor 106-2 supplies the second motor torque to the second input mechanism 134 via a second shaft 208 and a second motor output mechanism 212. The second shaft 208 is rotationally coupled to the gimbal frame 206, and rotates relative thereto about the first rotational axis 112. The second shaft 208 is also non-rotationally coupled to the second input mechanism 134 and to the second motor output mechanism 212. The second motor output mechanism 212, which in the depicted embodiment is also implemented using a belt-driven pulley, transfers the second motor torque from the second motor 106-2 to the second shaft 208.

No matter the specific manner in which the first and second output torques are supplied to the first and second input mechanisms 132, 134, the first input mechanism 132 is configured, upon receipt of the first motor torque, to supply a first output torque, and the second input mechanism 134 is configured, upon receipt of the second motor torque, to supply a second output torque. The first motor torque and second output torque are in turn supplied to the user interface drive mechanism 136.

The user interface drive mechanism 136 is configured to rotate about the second rotational axis 114 and is coupled to the user interface 102. The user interface drive mechanism 136 is additionally configured, upon receipt of the first and second motor torques, to supply the drive torque and feedback force to the user interface 102. To implement this functionality, the user interface drive mechanism 136, at least in the depicted embodiment, is non-rotationally coupled to a third shaft 214. The third shaft 214 is rotationally coupled to the gimbal frame 206 to rotate relative thereto about the second rotational axis 114, and is non-rotationally coupled to the user interface 102.

The idler mechanism 138 is spaced apart from the user interface drive mechanism 136 and is configured to rotate relative to the user interface 102 about the second rotational axis 114. The idler mechanism 138 is also coupled to receive the first and second output torques from the first and second input mechanisms 132 and 134, respectively. However, because the idler mechanism 138 is rotatable relative to the user interface 102, it does not supply any drive torque or feedback force thereto. As may be readily seen in FIGS. 2 and 3, the idler mechanism 138 is non-rotationally coupled to a fourth shaft 216, which is rotationally coupled to both the gimbal frame 206 and the user interface 102. The fourth shaft 216 thus rotates relative to the gimbal frame 206 and the user interface 102 about the second rotational axis 114.

Before proceeding further, it is noted that the first output torque and second output torque may be transferred from the first and second input mechanisms 132, 134, respectively, to the user interface output mechanism 136 and the idler mechanism 138 using any one of numerous techniques. For example, the first and second input mechanisms 132, 134, the user interface drive mechanism 136, and the idler mechanism 138 may be configured as a meshed gear mechanism. In the depicted embodiment, however, the first input mechanism 132, the second input mechanism 134, the user interface drive mechanism 136, and the idler mechanism 138 are each configured as pulleys that have a cable groove 218 formed therein. A cable 222 is disposed within at least a portion of the cable groove 218 in each of the first input mechanism 132, the second input mechanism 134, the drive mechanism 136, and the idler mechanism 138. It will be appreciated that in some embodiments, the first input mechanism 132, the second input mechanism 134, the drive mechanism 136, and the idler mechanism 138 could each include two cable grooves, and two cables are disposed, one each, at least partially in the two cable grooves. This latter embodiment provides redundancy in the unlikely event one of the cables were to become inoperable.

From the foregoing, it may be readily appreciated that the first and second input mechanisms 132, 134 correspond to the dual-inputs of the dual-input/single-output differential mechanism, and that the user interface drive mechanism 136 corresponds to the single-output. The above-mentioned speed reduction from the inputs of the differential mechanism to the output of the differential mechanism is implemented by sizing the user interface drive mechanism 136 different than the first and second input mechanisms 132, 134. More specifically, the effective diameter of the user interface drive mechanism 136, and thus also the idler mechanism 138, is larger than the effective diameters of the first and second input mechanisms 132, 134.

No matter how the gimbal assembly 104 is configured to specifically implement the speed reduction, it will be appreciated that it may be configured to implement any one of numerous speed reduction ratios (e.g., an N:1 reduction ratio, where N>1) from the first and second input mechanisms 132, 134 to the drive mechanism 136. Thus, when the first and second motors 106-1, 106-2 are implemented using identical motors, the N:1 reduction ratio enables the maximum drive torque that is supplied to the user interface 102 about the second rotational axis 114 to be N-times greater than the maximum drive torque that is supplied to the user interface 102 about the first rotational axis 112. Stated another way, the maximum feedback force supplied to the user interface 102 when it is moved in a direction along the first rotational axis 112 (e.g., in the forward or aft direction 116, 118) will be N-times greater than the feedback force supplied to the user interface 102 when it is moved in a direction along the second rotational axis 114 (e.g., in the left or right direction 122, 124). This allows for both motors 106 to be sized for the maximum drive torque needed for rotation about the first rotational axis 114, while still achieving the higher maximum drive torque needed for rotation about the first rotational axis.

In addition to the above, the gimbal assembly 104 preferably includes a plurality of passive feedback mechanisms to provide passive, return-to-null feedback to the user interface 102. The passive feedback mechanisms provide a back-up to the motors 106, should one or more become inoperable or otherwise unavailable. It will be appreciated that the number and type of passive feedback mechanisms may vary, but in the depicted embodiment these include a first spring 224 and a second spring 226. The first spring 224 is coupled to the gimbal assembly 104 and is configured to supply a first return force to the user interface 102 that resists rotational motion of the user interface 102 about the first rotational axis 112. The second spring 226 is also coupled to the gimbal assembly 104, but is configured to supply a second return force to the user interface 102 that resists rotational motion of the user interface 102 about the second rotational axis 114. The types of springs may vary, but in a particular preferred embodiment, the first and second springs 224, 226 are each implemented using a plurality of leaf springs.

Figure 4:
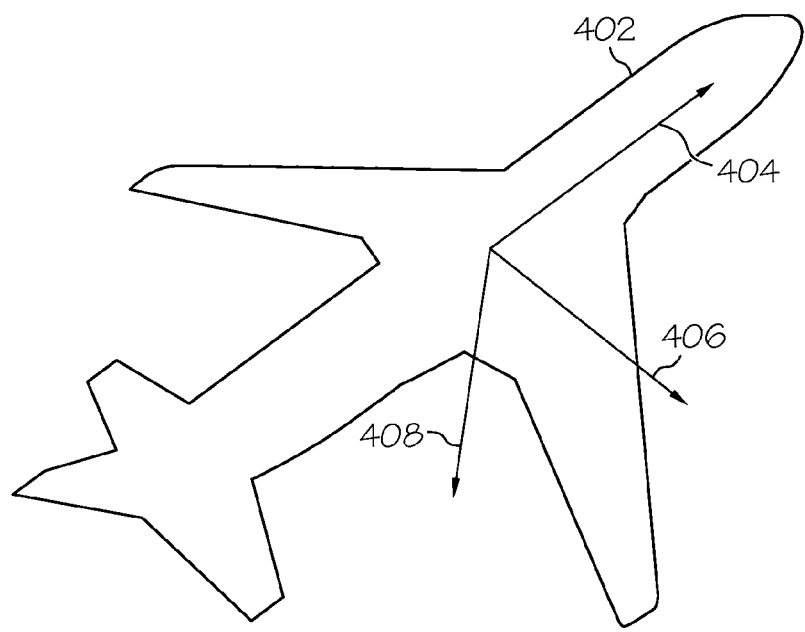
FIG. 4 depicts a simplified representation of an aircraft together with its three perpendicular control axes.

Having described the general structure of the active human-machine interface system 100, and the gimbal assembly 104 that comprises the system 100, the operation of the system 100, and more specifically how the motor control 108 is configured to selectively energize one or both motors 106 will now be described. In doing so, it is assumed that the user interface 102 is initially in the null position 110. It is additionally assumed that the user interface system 100 is installed in a vehicle, such as the aircraft 402 that is depicted in FIG. 4, which is controllable about at least two perpendicular axes—a roll axis 404 and a pitch axis 406. As is generally known, an aircraft 402 may also controllable about a third perpendicular axis, a yaw axis 408, which is additionally depicted in FIG. 4 for completeness.

Figure 5:
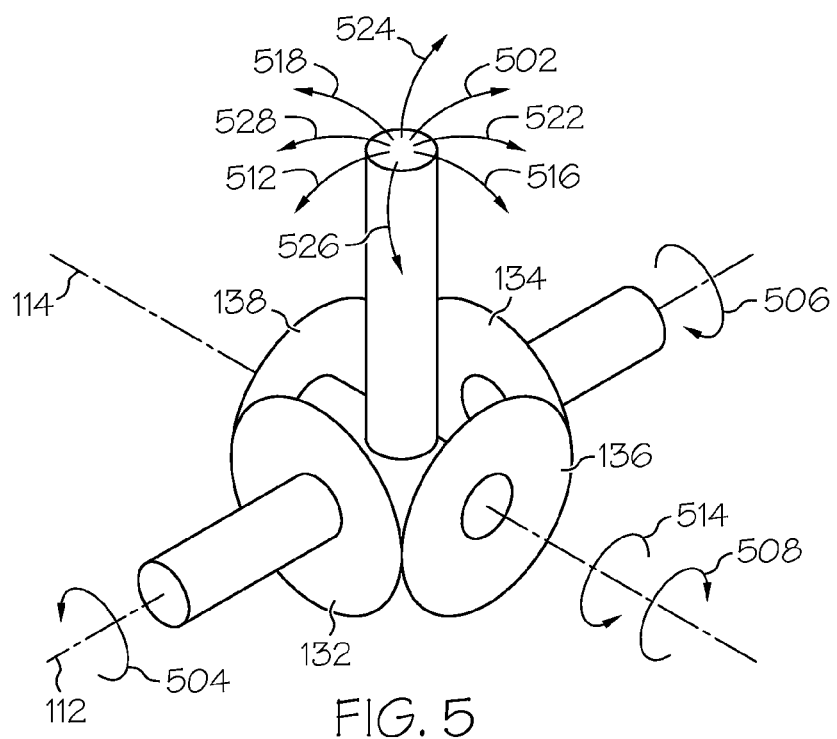
FIG. 5 depicts a simplified representation of the gimbal assembly showing variations in rotational movements of its various parts.

Referring now to FIG. 5, a simplified representation of the user interface 102 and a portion of the gimbal assembly 104 are depicted. In particular, the first and second input mechanisms 132, 134, the user interface drive mechanism 136, and the idler mechanism 138 are depicted. It should be noted that the user interface drive mechanism 136 and the idler mechanism 138 are, for ease of illustration and for purposes of this description only, depicted as having the same or very similar diameters as the first and second input mechanisms 132, 134.

With the above background in mind, and with continued reference to FIG. 5, if a pilot in the aircraft 402 wishes to implement a pitch down maneuver, the pilot will move the user interface 102 in the forward, or pitch down, direction 502. To provide the proper drive torque and feedback to the user interface 102, the motor control 108, in response to the user interface movement signals supplied thereto, will simultaneously energize the first and second motors 106-1, 106-2 to rotate in opposite directions. Specifically, the first motor 106-1 will be energized to rotate in a first direction 504 about the first rotational axis, and the second motor 106-2 will be energized to rotate in a second direction 506 about the first rotational axis. This, in turn, will cause the user interface drive mechanism 136 to rotate in a third direction 508 about the second rotational axis 114.

As may be readily appreciated, if the pilot wishes to implement a pitch up maneuver, the pilot will move the user interface 102 in the backward, or pitch up, direction 512. To provide the proper drive torque and feedback to the user interface 102, the motor control 108, in response to the user interface movement signals supplied thereto, will also simultaneously energize the first and second motors 106-1, 106-2 to rotate in opposite directions. However, the first motor 106-1 will be energized to rotate in the second direction 506 about the first rotational axis 112, and the second motor 106-2 will be energized to rotate in the first direction 504 about the first rotational axis 112. As a result, the user interface drive mechanism 136 will rotate in a fourth direction 514 about the second rotational axis 114.

Now, if the pilot wishes to implement a roll right maneuver, the pilot will move the user interface 102 in the rightward, or roll right, direction 516. To provide the proper drive torque and feedback to the user interface 102, the motor control 108, in response to the user interface movement signals supplied thereto, will simultaneously energize the first and second motors 106-1, 106-2 to rotate in the same direction. Specifically, the first and second motors 106-1, 106-2 will be energized to rotate in the second direction 506 about the first rotational axis 112. As a result, the user interface drive mechanism 136 will not rotate about the second rotational axis 114.

As may be readily appreciated, if the pilot wishes to implement a roll left maneuver, the pilot will move the user interface 102 in the leftward, or roll left, direction 518. To provide the proper drive torque and feedback to the user interface 102, the motor control 108, in response to the user interface movement signals supplied thereto, will also simultaneously energize the first and second motors 106-1, 106-2 to rotate in the same direction. However, the first and second motors 106-1, 106-2 will be energized to rotate in the first direction 504 about the first rotational axis 112. Again, the user interface drive mechanism 136 will, as a result, not rotate about the second rotational axis 114.

The above operations are what may be referred to as "on-axis motion" of the user interface 102. That is, operations of the user interface 102 along either the first rotational axis 112 or the second rotational axis 114. For operations of the user interface 102 along both rotational axes 112, 114, which may be referred to as "cross-axis motion," the motor control 108 is configured to selectively energize only one of the motors 106 to rotate, or to selectively energize both motors 106 to simultaneously rotate at different rotational speeds in either the same or different directions. Whether only one or both motors 106 are energized to rotate, and the direction of rotation, will depend upon the particular cross axis motion vector movement of the user interface 102.

For example, if the pilot wishes to make a pitch down/roll right maneuver, the pilot will move the user interface 102 in a forward-right, or pitch down/roll right, direction 522. If the pitch down/roll right movement comprises equal vector components in both the pitch and roll axes, then the motor control 108, in order to provide the proper drive torque and feedback to the user interface 102, will energize only the second motor 106-2 to rotate. Specifically, the second motor 106-2 will be energized to rotate in the second direction 506 about the first rotational axis 112. This, in turn, will cause the user interface drive mechanism 136 to rotate in the third direction 508 about the second rotational axis 114. If, however, the pitch down/roll right movement comprises non-equal vector components in the pitch and roll axes, then the motor control 108, in order to provide the proper drive torque and feedback to the user interface 102, will energize both motors 106 to rotate, but in opposite directions and at different rates. Specifically, the second motor 106-2 will be energized to rotate in the second direction 506 and the first motor 106-1 will be energized to rotate in the first direction 504; however, the second motor 106-2 will be energized to rotate at a faster rate than the first motor 106-1.

To make a pitch down/roll left maneuver, the pilot will move the user interface 102 in a forward-left, or pitch down/roll left, direction 524. If the pitch down/roll right movement comprises equal vector components in both the pitch and roll axes, then the motor control 108, in order to provide the proper drive torque and feedback to the user interface 102, will energize only the first motor 106-1 to rotate. Specifically, the first motor 106-1 will be energized to rotate in the first direction 504 about the first rotational axis 112, which will in turn cause the user interface drive mechanism 136 to rotate in the third direction 508 about the second rotational axis 114. If, however, the pitch down/roll left movement comprises non-equal vector components in the pitch and roll axes, then the motor control 108, in order to provide the proper drive torque and feedback to the user interface 102, will energize both motors 106 to rotate in the first direction 504, but at different rates. Specifically, the first motor 106-1 will be energized to rotate at a faster rate than the second motor 106-2.

For a pitch up/roll right maneuver, the pilot will move the user interface 102 in a backward-right, or pitch up/roll right, direction 526. If the pitch up/roll right movement comprises equal vector components in both the pitch and roll axes, then the motor control 108, in order to provide the proper drive torque and feedback to the user interface 102, will energize only the first motor 106-1 to rotate in the second direction 506 about the first rotational axis 112. This will cause the user interface drive mechanism 136 to rotate in the fourth direction 514 about the second rotational axis 114. If, however, the pitch up/roll right movement comprises non-equal vector components in the pitch and roll axes, then the motor control 108, in order to provide the proper drive torque and feedback to the user interface 102, will energize both motors 106 to rotate, but in opposite directions and at different rates. Specifically, the first motor 106-1 will be energized to rotate in the second direction 506 and the second motor 106-2 will be energized to rotate in the first direction 504; however, the first motor 106-1 will be energized to rotate at a faster rate than the second motor 106-2.

As may be readily understood, for a pitch up/roll left maneuver, the pilot will move the user interface 102 in a backward-left, or pitch up/roll left, direction 528. If the pitch up/roll left movement comprises equal vector components in both the pitch and roll axes, then the motor control 108, in order to provide the proper drive torque and feedback to the user interface 102, will energize only the second motor 106-2 to rotate in the first direction 504 about the first rotational axis 112. This will cause the user interface drive mechanism 136 to rotate in the fourth direction 514 about the second rotational axis 114. If, however, the pitch up/roll left movement comprises non-equal vector components in the pitch and roll axes, then the motor control 108, in order to provide the proper drive torque and feedback to the user interface 102, will energize both motors 106 to rotate in the first direction 504, but at different rates. Specifically, the second motor 106-2 will be energized to rotate at a faster rate than the first motor 106-1.

The active user interface system 100 described above may be physically implemented using any one of numerous configurations. For completeness, one particular physical implementation of the active user interface system 100, without the motor control 108 and electrical interconnections therefor, is depicted in FIGS. 6-13, and will be briefly described. Before doing so, however, it is noted that like reference numerals in FIGS. 6-13 refer to like parts in FIGS. 1-5. Moreover, descriptions of parts that have already been described will, if provided at all, not be provided in detail.

Figure 6:
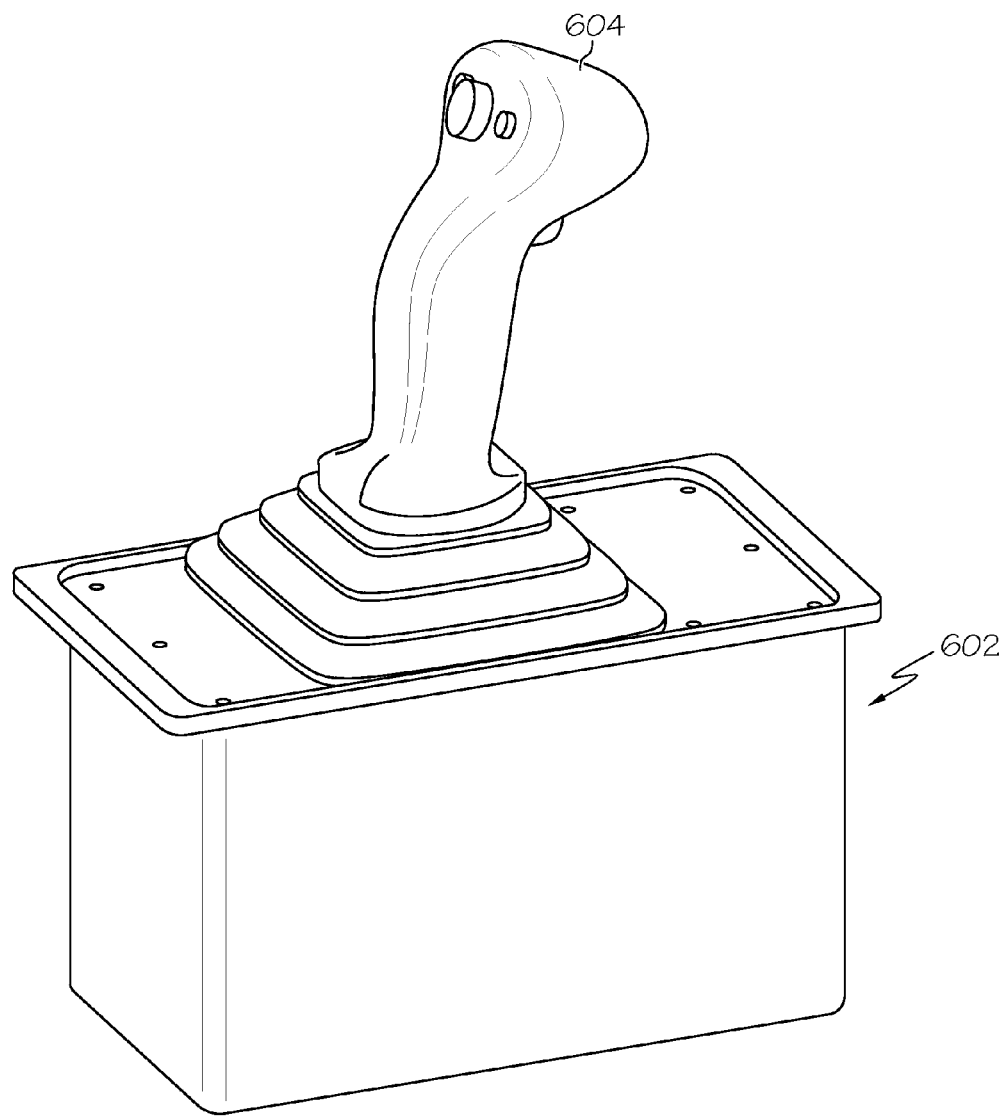
Figure 7:
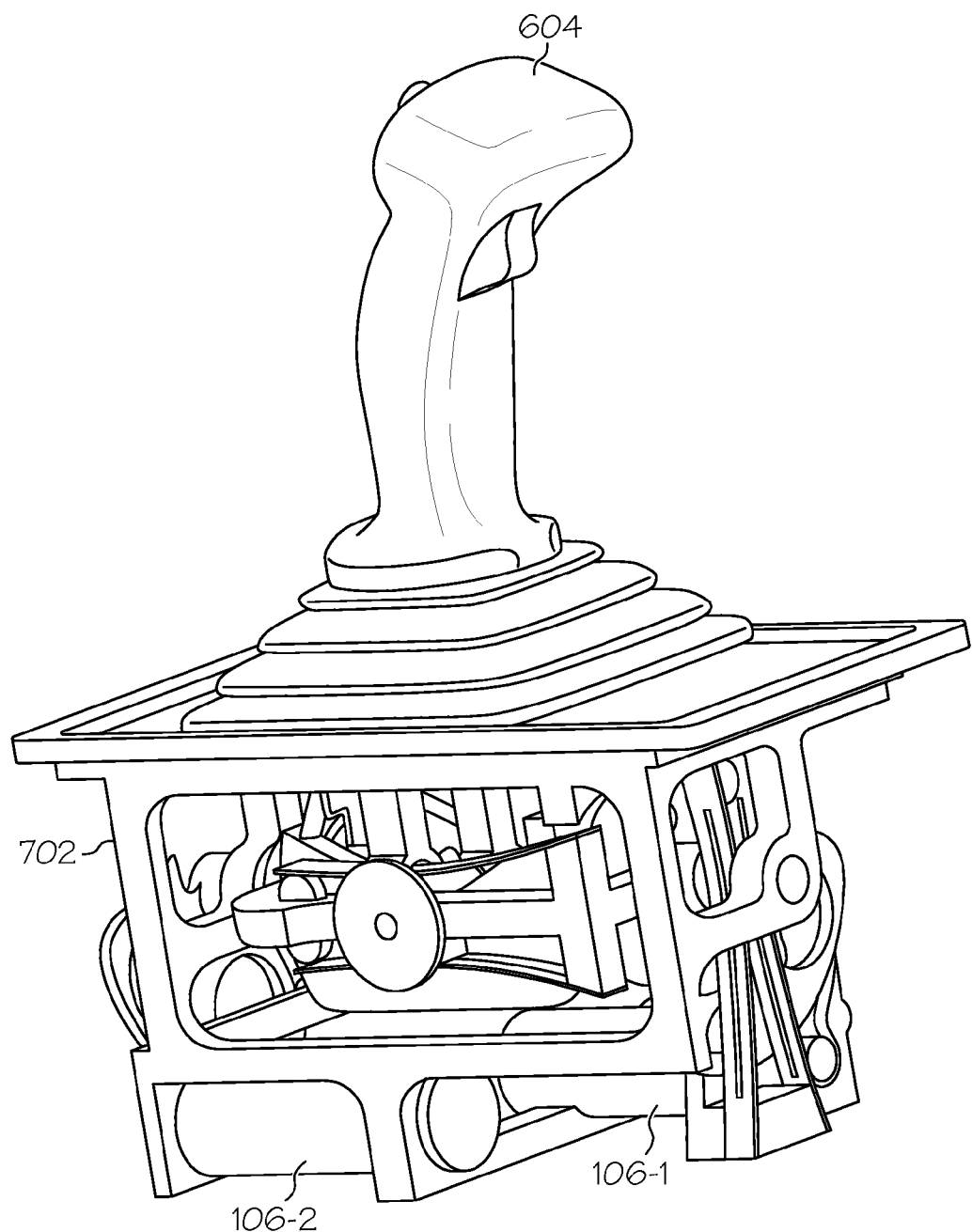
Figure 8:
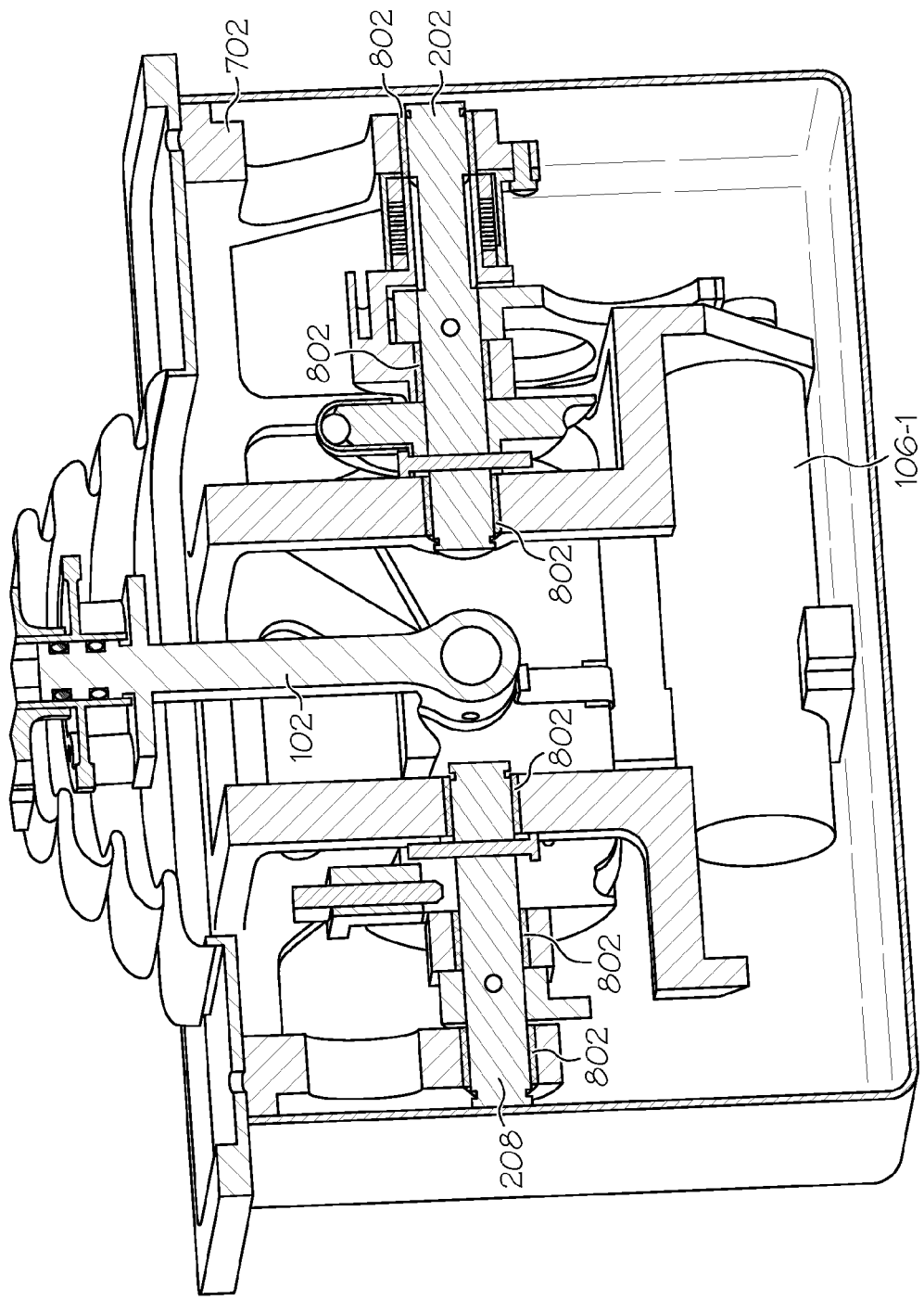
Figure 9:
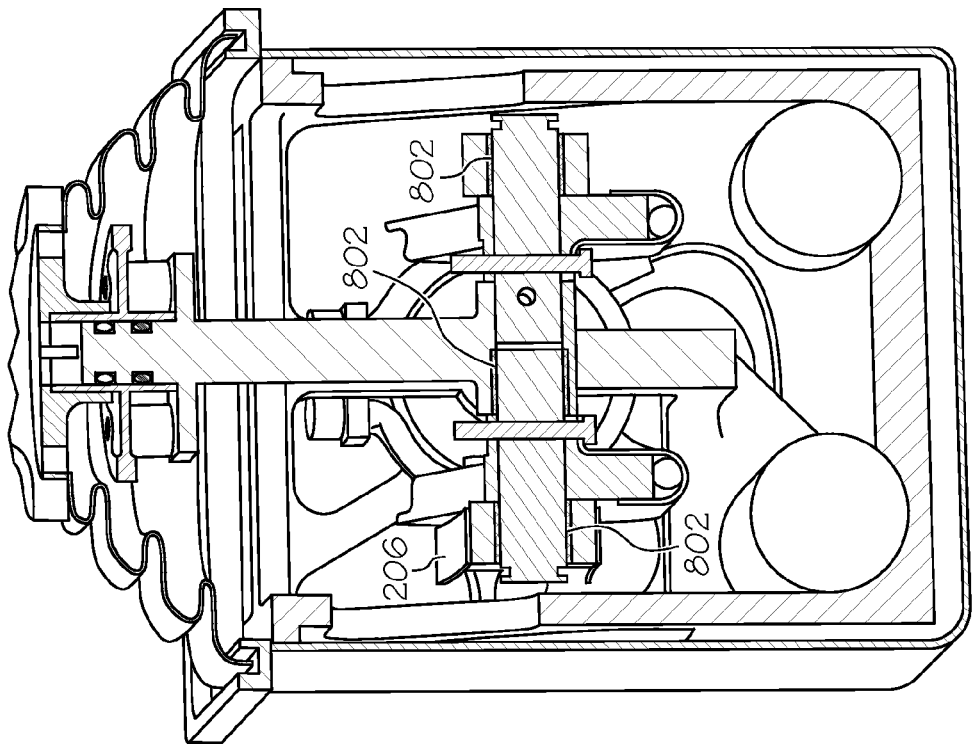
Figure 10:
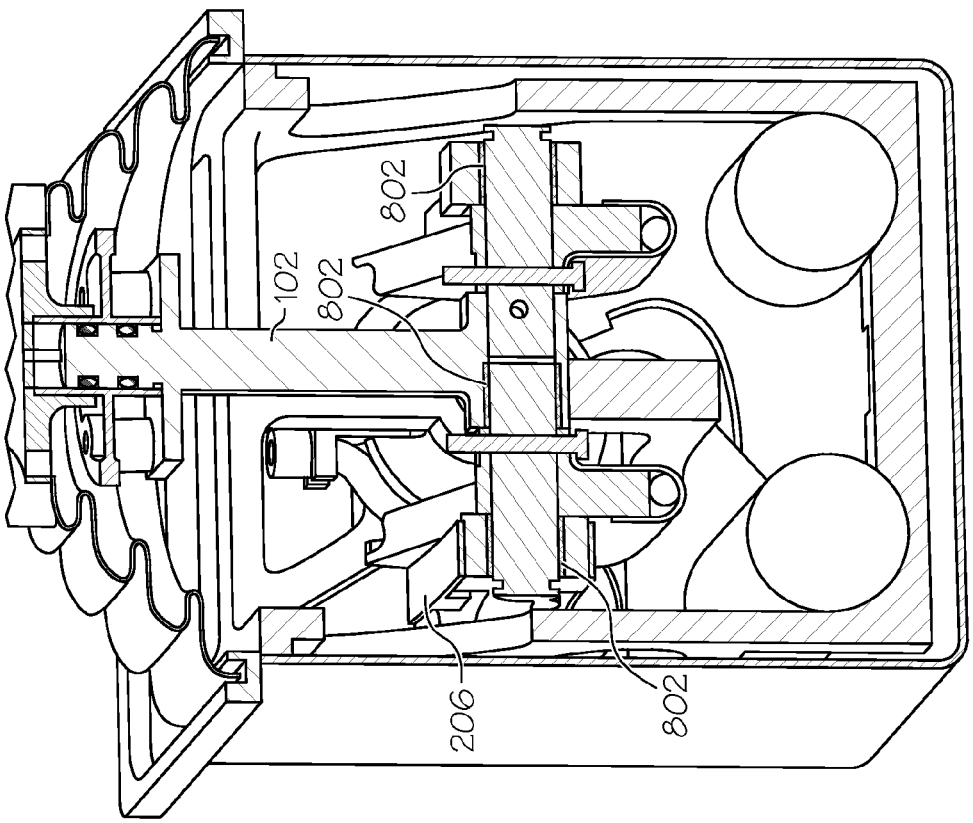

Turning first to FIGS. 6 and 7, the gimbal assembly 104 and the motors 106 are preferably disposed within a housing assembly 602, and the user interface extends through the housing assembly 602 and is coupled to a grip 604. Moreover, the gimbal assembly 104 is rotationally mounted on a chassis frame 702, and the motors 106 are non-rotationally mounted on the chassis frame 702. More specifically, and as FIG. 8 depicts more clearly, the first and second shafts 202, 208 are rotationally mounted on the chassis frame 702 and the gimbal frame 206 preferably via carbon impregnated plastic bushings 802. Moreover, as FIGS. 9 and 10 depict, the third shaft 214 is rotationally mounted on the gimbal frame 206, and the fourth shaft 216 is rotationally mounted on the gimbal frame 206 and to the user interface 102, also preferably via carbon impregnated plastic bushings 802.

Figure 11:
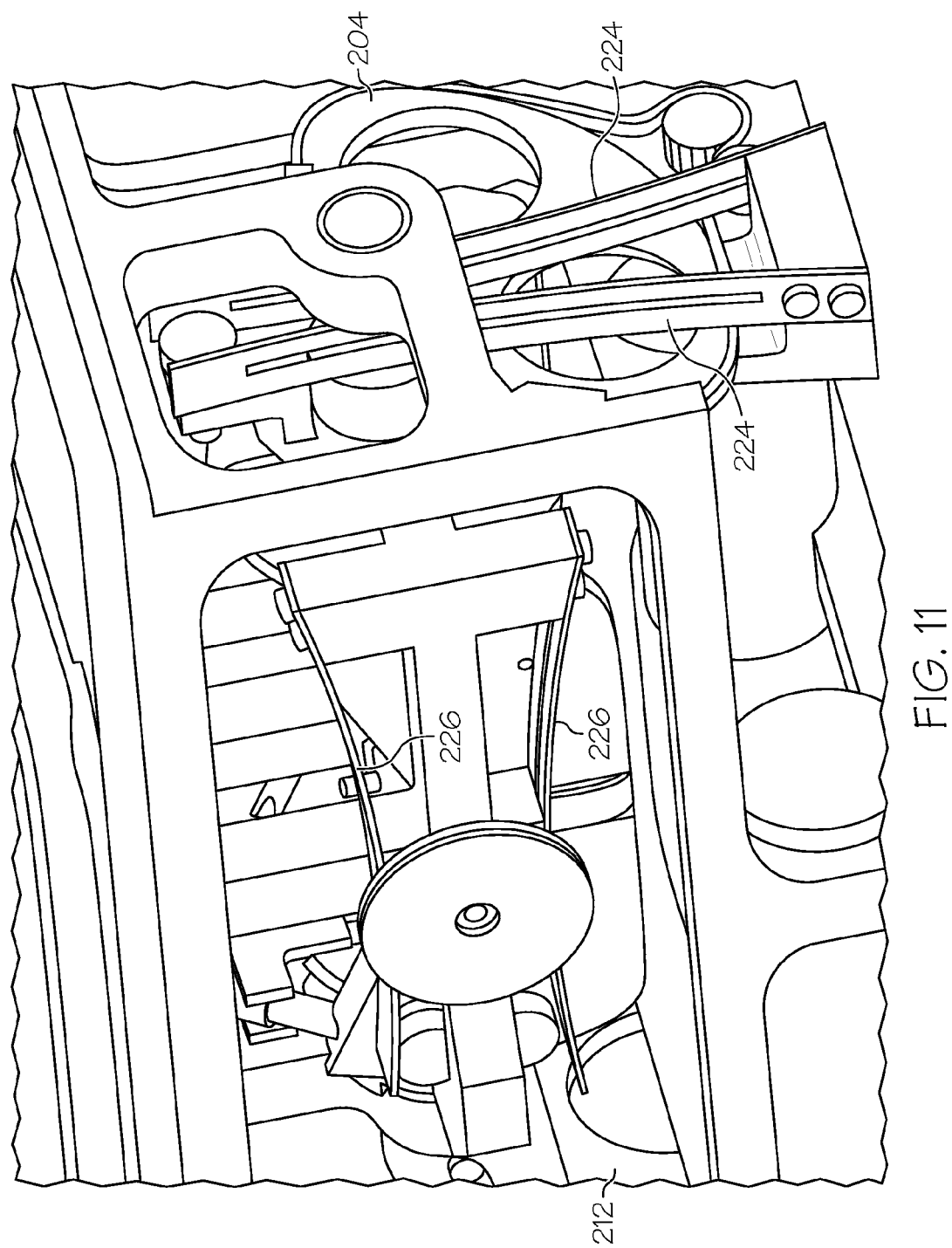
Figure 12:
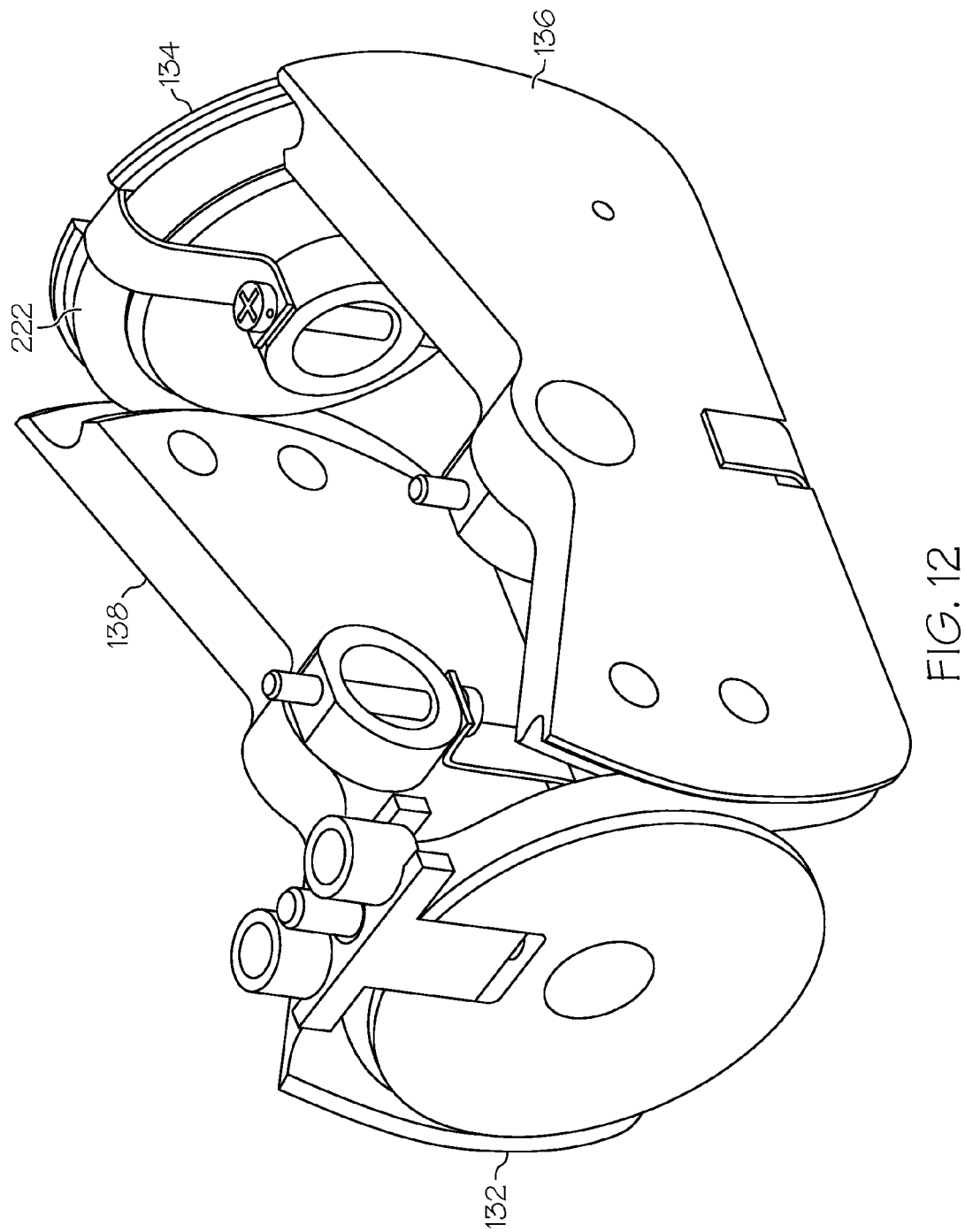

With reference to FIG. 11, the configuration of the first motor output mechanism 204 is depicted, as are the first spring 224 and the second spring 226. Though not depicted in FIG. 11 as clearly as the first motor output mechanism 204, it is noted that the second motor output mechanism 212 is substantially identical to the first motor output mechanism 226. The configurations of the first input mechanism 132, the second input mechanism 134, the user interface drive mechanism 136, and the idler mechanism 138, as well as the cable 222 and the manner in which the cable 222 is wound thereon are depicted in FIG. 12. The manner in which the user interface movement sensors 126-1, 126-2 are mounted on the gimbal assembly 104 is depicted in FIG. 13. A particular preferred implementation of one of the user interface movement sensors 126 is depicted in FIGS. 14 and 15 and, for completeness, will be briefly described.

The depicted user interface movement sensor 126 includes a magnet section 1402 and a sensor section 1404. The magnet section 1402 includes a magnet mount structure 1406 on which one or more magnets 1408 are mounted. The sensor section 1404 includes a sensor mount structure 1412 on which a plurality of MR sensors 1414 are mounted. The magnet section 1402 and sensor section 1404 are disposed adjacent to, but spaced apart from, each other. The MR sensors 1414 sense the movement of the one or more magnets 1408 relative thereto.

The active user interface system 100 described herein is relatively simple, relatively small, relatively light-weight, and relatively inexpensive. It implements an N:1 reduction ratio that enables the maximum drive torque that is supplied to the user interface 102 about the second rotational axis 114 to be N-times greater than the maximum drive torque that is supplied to the user interface 102 about the first rotational axis 112. This allows for identical motors 106 to be used, and for the motors 106 to be sized for the maximum drive torque needed for rotation about the first rotational axis 114, while still achieving the higher maximum drive torque needed for rotation about the first rotational axis.

The word "exemplary" is used exclusively herein to mean "serving as an example, instance, or illustration." Any embodiment described herein as "exemplary" is not necessarily to be construed as preferred or advantageous over other embodiments. Moreover, in this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An active feedback user interface system, comprising:
   a plurality of motors, each motor configured, when energized, to supply a motor torque about a first rotational axis;
   a first input mechanism configured to rotate about the first axis, the first input mechanism coupled to receive the motor torque supplied from a first one of the plurality of motors and configured, upon receipt thereof, to supply a first output torque,
   a second input mechanism spaced apart from the first input mechanism and configured to rotate about the first rotational axis, the second input mechanism coupled to receive the motor torque from a second one of the plurality of motors and configured, upon receipt thereof, to supply a second output torque;
   a user interface drive mechanism configured to rotate about a second rotational axis that is perpendicular to, and co-planar with, the first rotational axis, the user interface drive mechanism coupled to receive the first and second output torques from the first and second input mechanisms, respectively; and
   an idler mechanism spaced apart from the user interface drive mechanism and configured to rotate with the user interface drive mechanism about the second rotational axis,
   wherein the first and second input mechanisms and the user interface drive mechanism are configured to implement an N:1 reduction ratio, wherein N is greater than 1.

2. The system of claim 1, wherein:
   the first and second input mechanisms have a first diameter;
   the user interface drive mechanism and the idler mechanism each have a second diameter; and
   the second diameter is N-times greater than the first diameter.

3. The system of claim 1, further comprising:
   a motor control coupled to, and configured to selectively energize, one or more of the plurality of motors.

4. The system of claim 3, further comprising:
   a user interface coupled to the user interface drive mechanism, the user interface adapted to receive a user input force and configured, in response to the user input force, to rotate in a rotational direction about one or both of the first rotational axis and the second rotational axis,
   wherein the plurality of motors are identical, and wherein the motor control is further configured to selectively energize the plurality of motors to:
   simultaneously rotate in the same direction when the user interface is rotated about the first rotational axis only; and
   simultaneously rotate in opposite directions when the user interface is rotated about the second rotational axis only.

5. The system of claim 4, wherein the motor control is further configured, when the user interface is simultaneously rotated about the first and second rotational axes, to selectively energize:
   only one of the plurality of motors to rotate;
   both of the plurality of motors to rotate in opposite directions; or
   or both of the plurality of motors to rotated in the same direction.

6. The system of claim 1, wherein:
   the first input mechanism, the second input mechanism, the drive mechanism, and the idler mechanism are each configured as a pulley having a cable groove therein; and
   the system further comprises a cable disposed within at least a portion of the cable groove in each of the first input mechanism, the second input mechanism, the drive mechanism, and the idler mechanism.

7. The system of claim 1, further comprising:
   a gimbal frame;
   a first shaft rotationally coupled to the gimbal frame and configured to rotate relative thereto about the first rotational axis, the first shaft non-rotationally coupled to the first input mechanism and further coupled to receive the motor torque from the first one of the motors;
   a second shaft rotationally coupled to the gimbal frame and configured to rotate relative thereto about the first rotational axis, the second shaft non-rotationally coupled to the second input mechanism and further coupled to receive the motor torque from the second one of the motors;
   a third shaft rotationally coupled to the gimbal frame and configured to rotate relative thereto about the second rotational axis, the third shaft non-rotationally coupled to both the drive mechanism and to the user interface; and
   a fourth shaft rotationally coupled the gimbal frame and to the user interface and configured to rotate relative thereto about the second rotational axis, the fourth shaft non-rotationally coupled to the idler mechanism.

8. The system of claim 7, further comprising:
   a first spring coupled to the gimbal frame and configured to supply a first return force to the user interface that resists rotational motion of the user interface about the first rotational axis; and
   a second spring coupled to the gimbal frame and configured to supply a second return force to the user interface that resists rotational motion of the user interface about the second rotational axis.

9. The system of claim 7, further comprising:
   a first position sensor coupled to the user interface and configured to sense user interface rotation about the first rotational axis; and
   a second position sensor coupled to the user interface and configured to sense user interface rotation about the second rotational axis.

10. The system of claim 7, further comprising:
    a first motor output mechanism coupled between the first one of the motors and the first shaft, the first motor output mechanism configured to transfer the motor torque from the first one of the motors to the first shaft; and a second motor output mechanism coupled between the second one of the motors and the second shaft, the second motor output mechanism configured to transfer the motor torque from the second one of the motors to the second shaft.

11. An active gimbal assembly for a vehicle that is controllable about at least a roll axis and a pitch axis, the gimbal assembly comprising:
a first motor configured, when energized, to supply a first motor torque about the roll axis;
a second motor configured, when energized, to supply a second motor torque about the roll axis, the second motor identical to the first motor;
a first input mechanism configured to rotate about the roll axis, the first input mechanism coupled to receive the first motor torque and configured, upon receipt thereof, to supply a first output torque,
a second input mechanism spaced apart from the first input mechanism and configured to rotate about the roll axis, the second input mechanism coupled to receive the second motor torque and configured, upon receipt thereof, to supply a second output torque;
a user interface drive mechanism configured to rotate about the pitch axis, the user interface drive mechanism coupled to receive the first and second output torques from the first and second input mechanisms, respectively; and
an idler mechanism spaced apart from the user interface drive idler mechanism and configured to rotate about the pitch axis,
wherein the gimbal assembly is configured to implement an N:1 reduction ratio from the first and second input mechanisms to the user interface drive mechanism.

12. The assembly of claim 11, wherein;
the first input mechanism, the second input mechanism, the user interface drive mechanism, and the idler mechanism are each configured as a pulley having a cable groove therein; and
the system further comprises a cable disposed within at least a portion of the cable groove in each of the first input mechanism, the second input mechanism, the user interface drive mechanism, and the idler mechanism.

13. The assembly of claim 11, further comprising:
a first spring coupled to the gimbal assembly and configured to supply a first return force that resists rotational motion about the roll axis; and
a second spring coupled to the gimbal assembly and configured to supply a second return force that resists rotational motion about the pitch axis.

14. The assembly of claim 11, wherein the gimbal assembly further comprises:
a gimbal frame;
a user interface adapted to receive a user input force and configured, in response to the user input force, to rotate about one or both of the roll axis and the pitch axis;
a first shaft rotationally coupled to the gimbal frame and configured to rotate relative thereto about the roll axis, the first shaft non-rotationally coupled to the first input mechanism and further coupled to receive the first motor torque;
a second shaft rotationally coupled to the gimbal frame and configured to rotate relative thereto about the roll axis, the second shaft non-rotationally coupled to the second input mechanism and further coupled to receive the second motor torque;
a third shaft rotationally coupled to the gimbal frame and configured to rotate relative thereto about the pitch axis, the third shaft non-rotationally coupled to both the user interface drive mechanism and to the user interface; and
a fourth shaft rotationally coupled the gimbal frame and to the user interface and configured to rotate relative thereto about the pitch axis, the fourth shaft non-rotationally coupled to the idler mechanism.

15. The assembly of claim 14, further comprising:
a first motor output gear coupled between the first motor and the first shaft, the first motor output gear configured to transfer the first motor torque from the first motor to the first shaft; and
a second motor output gear coupled between the second motor and the second shaft, the second motor output gear configured to transfer the second motor torque from the second motor to the second shaft.

16. An active feedback user interface system, comprising:
a user interface adapted to receive a user input force and configured, in response to the user input force, to rotate in a rotational direction about one or both of a roll axis and a pitch axis, the roll and pitch axes being perpendicular;
a first motor configured to selectively supply a first motor torque along the roll axis;
a second motor configured to selectively supply a second motor torque along the roll axis; and
a gimbal assembly coupled to the user interface and to the first and second motors, the gimbal assembly configured, upon receipt of the first and second motor torques, to sum the first and second motor torques and supply a feedback force to the user interface that opposes the rotational direction thereof, the gimbal assembly comprising:
a first input mechanism having a first effective diameter and configured to rotate about the roll axis, the first input mechanism coupled to receive the first motor torque from the first motor and configured, upon receipt thereof, to supply a first output torque,
a second input mechanism spaced apart from the first input mechanism, the second input mechanism having the first effective diameter and configured to rotate about the roll axis, the second input mechanism coupled to receive the second motor torque from the second motor and configured, upon receipt thereof, to supply a second output torque,
a user interface drive mechanism having a second effective diameter and configured to rotate about the pitch axis, the user interface drive mechanism coupled to the user interface and further coupled to receive the first and second output torques from the first and second input mechanisms, respectively, the user interface drive mechanism configured, upon receipt of the first and second output torques, to supply the feedback force to the user interface, and
an idler mechanism spaced apart from the user interface drive mechanism, the idler mechanism having the second effective diameter and configured to rotate, with the user interface drive mechanism and relative to the user interface, about the pitch axis,
wherein the first effective diameter is less than the second effective diameter, whereby maximum feedback force about the pitch axis is greater than maximum feedback force about the roll axis.

17. The system of claim 16, wherein;
the first input mechanism, the second input mechanism, the drive mechanism, and the idler mechanism are each configured as a pulley having a cable groove therein; and the system further comprises a cable disposed within at least a portion of the cable groove in each of the first input mechanism, the second input mechanism, the drive mechanism, and the idler mechanism.

18. The system of claim 16, further comprising:
a first spring coupled to the gimbal assembly and configured to supply a first return force to the user interface that resists rotational motion of the user interface about the roll axis; and
a second spring coupled to the gimbal assembly and configured to supply a second return force to the user interface that resists rotational motion of the user interface about the pitch axis.

19. The system of claim 16, wherein the gimbal assembly further comprises:
a gimbal frame;
a first shaft rotationally coupled to the gimbal frame and configured to rotate relative thereto about the roll axis, the first shaft non-rotationally coupled to the first input mechanism and further coupled to receive the first motor torque;
a second shaft rotationally coupled to the gimbal frame and configured to rotate relative thereto about the roll axis, the second shaft non-rotationally coupled to the second input mechanism and further coupled to receive the second motor torque;
a third shaft rotationally coupled to the gimbal frame and configured to rotate relative thereto about the pitch axis, the third shaft non-rotationally coupled to both the drive mechanism and to the user interface; and
a fourth shaft rotationally coupled the gimbal frame and to the user interface and configured to rotate relative thereto about the pitch axis, the fourth shaft non-rotationally coupled to the idler mechanism.

20. The system of claim 19, further comprising:
a first motor output gear coupled between the first motor and the first shaft, the first motor output gear configured to transfer the first motor torque from the first motor to the first shaft; and
a second motor output gear coupled between the second motor and the second shaft, the second motor output gear configured to transfer the second motor torque from the second motor to the second shaft.

\* \* \* \* \*

UNITED STATES PATENT AND TRADEMARK OFFICE
CERTIFICATE OF CORRECTION

| | | |
|---|---|---|
| PATENT NO. | : 8,742,711 B2 | Page 1 of 1 |
| APPLICATION NO. | : 13/240933 | |
| DATED | : June 3, 2014 | |
| INVENTOR(S) | : Casey Hanlon et al. | |

It is certified that error appears in the above-identified patent and that said Letters Patent is hereby corrected as shown below:

In the Claims

Column 13, line 29, "drive idler mechanism" should be changed to -- drive mechanism --.

Signed and Sealed this
Third Day of March, 2015

Michelle K. Lee
*Deputy Director of the United States Patent and Trademark Office*